United States Patent

Yamamori et al.

(10) Patent No.: US 11,515,548 B2
(45) Date of Patent: Nov. 29, 2022

(54) FUEL CELL SYSTEM

(71) Applicant: TOYOTA JIDOSHA KABUSHIKI KAISHA, Toyota (JP)

(72) Inventors: Keitaro Yamamori, Okazaki (JP); Koro Fujio, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 17/216,626

(22) Filed: Mar. 29, 2021

(65) Prior Publication Data

US 2021/0367250 A1 Nov. 25, 2021

(30) Foreign Application Priority Data

May 19, 2020 (JP) .............................. JP2020-087489

(51) Int. Cl.
 *H01M 8/04223* (2016.01)
 *H01M 8/04119* (2016.01)
 *H01M 8/04225* (2016.01)
 *H01M 8/04701* (2016.01)

(52) U.S. Cl.
 CPC ... *H01M 8/04231* (2013.01); *H01M 8/04179* (2013.01); *H01M 8/04225* (2016.02); *H01M 8/04701* (2013.01); *H01M 2250/20* (2013.01)

(58) Field of Classification Search
 None
 See application file for complete search history.

(56) References Cited

U.S. PATENT DOCUMENTS

| | | | |
|---|---|---|---|
| 2004/0033395 A1* | 2/2004 | Thompson | H01M 8/04768 429/432 |
| 2004/0115495 A1* | 6/2004 | Asai | H01M 8/04089 429/444 |
| 2005/0069751 A1* | 3/2005 | Zhang | H01M 8/0228 429/444 |
| 2006/0141310 A1* | 6/2006 | Miyata | H01M 8/04231 429/513 |
| 2007/0017367 A1* | 1/2007 | McElroy | H01M 8/04097 95/90 |
| 2007/0092771 A1* | 4/2007 | Wake | H01M 8/0258 429/408 |

(Continued)

FOREIGN PATENT DOCUMENTS

| | | |
|---|---|---|
| JP | 2007073328 A | 3/2007 |
| JP | 2014197481 A | 10/2014 |
| JP | 2017010904 A | 1/2017 |

*Primary Examiner* — Haroon S. Sheikh
(74) *Attorney, Agent, or Firm* — Hunton Andrews Kurth LLP

(57) ABSTRACT

A fuel cell system includes a fuel cell stack, a reaction gas supply portion, and a control unit. The control unit performs two stages of purging that are a first purging and a second purging in which the flow rate of the reaction gas is smaller than the flow rate of the reaction gas of the first purging, and provides a purging standby time between the first purging and the second purging, and in a case in which an operation mode of the fuel cell stack when power generation of the fuel cell stack is stopped is a high output mode in which an output is higher than the output of a normal mode, the control unit makes a purging time longer than the purging time of the first purging that is performed in the normal mode.

2 Claims, 1 Drawing Sheet

(56) References Cited

U.S. PATENT DOCUMENTS

| | | | |
|---|---|---|---|
| 2009/0035614 A1* | 2/2009 | Wake | H01M 8/04753 429/408 |
| 2010/0119898 A1* | 5/2010 | Imai | H01M 8/04253 429/430 |
| 2010/0239924 A1* | 9/2010 | McElroy | H01M 8/04097 429/408 |
| 2016/0380282 A1 | 12/2016 | Maruo et al. | |
| 2019/0036135 A1* | 1/2019 | Hierl | C25B 15/08 |

* cited by examiner

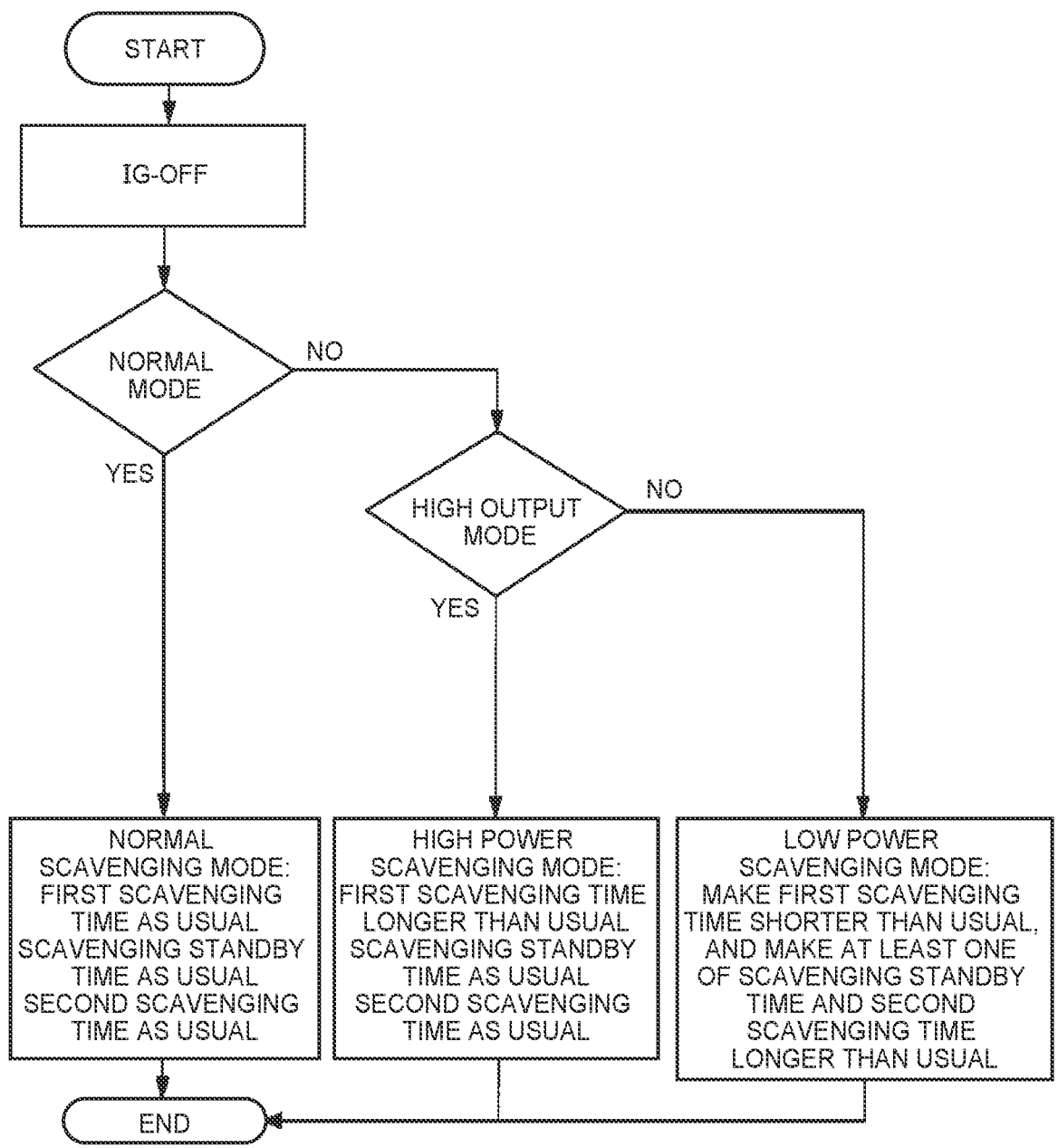

FUEL CELL SYSTEM

CROSS-REFERENCE TO RELATED APPLICATION

This application claims priority to Japanese Patent Application No. 2020-087489 filed on May 19, 2020, incorporated herein by reference in its entirety.

BACKGROUND

1. Technical Field

The present disclosure relates to a fuel cell system.

2. Description of Related Art

A fuel cell (FC) includes a fuel cell stack (hereinafter, may be simply referred to as a stack) in which a plurality of single cells (hereinafter, may be referred to as cells) are stacked. The fuel cell is a power generation device that extracts electrical energy by an electrochemical reaction between hydrogen ($H_2$) serving as a fuel gas and oxygen ($O_2$) serving as an oxidant gas. Hereinafter, the fuel gas and the oxidant gas may be simply referred to as "reaction gas" or "gas" without particular distinction.

A single cell of this fuel cell is usually configured of a membrane electrode assembly (MEA) and, if necessary, two separators sandwiching both sides of the membrane electrode assembly.

The membrane electrode assembly has a structure in which a catalyst layer and a gas diffusion layer are sequentially formed on both sides of a solid polymer electrolyte membrane (hereinafter, also simply referred to as an "electrolyte membrane") having proton ($H^+$) conductivity. Thus, the membrane electrode assembly may be referred to as a membrane electrode gas diffusion layer assembly (MEGA).

The separator usually has a structure in which a groove serving as a flow path of the reaction gas is formed on a surface in contact with the gas diffusion layer. This separator also functions as a current collector for the generated electricity.

At a fuel electrode (anode) of the fuel cell, hydrogen supplied from the gas flow path and the gas diffusion layer is protonated by the catalytic action of the catalyst layer, passes through the electrolyte membrane, and moves to the oxidant electrode (cathode). Electrons generated at the same time work through an external circuit and move to the cathode. Oxygen supplied to the cathode reacts with protons and electrons on the cathode to produce water.

The generated water applies humidity to the electrolyte membrane, and the excess water permeates through the gas diffusion layer and is discharged to the outside of the system.

Various studies have been conducted on fuel cell systems used in vehicles of fuel cell vehicles (hereinafter sometimes referred to as vehicles).

For example, Japanese Unexamined Patent Application Publication No. 2007-073328 (JP 2007-073328 A) discloses a fuel cell system having a stop time between two-step purging in wastewater treatment at the end of power generation of the FC.

Further, Japanese Unexamined Patent Application Publication No. 2017-010904 (JP 2017-010904 A) discloses a fuel cell system that prolongs a purging time in a winter mode in wastewater treatment at the end of power generation of the FC.

Japanese Unexamined Patent Application Publication No. 2014-197481 (JP 2014-197481 A) discloses a fuel cell system in which a second purging time is shorter than of a first purging time in a two-stage purging in wastewater treatment at the end of power generation of the FC.

SUMMARY

In a fuel cell system having a plurality of operation modes, it is necessary to adjust the water content of the MEA according to the operation mode. For example, when stopping power generation of the fuel cell stack in the high output mode, it is necessary to perform purging processing of the fuel cell stack so that the fuel cell stack has a high output when the fuel cell stack is started.

The present disclosure has been made in view of the above circumstances, and an object of the present disclosure is to provide a fuel cell system capable of improving the startability of a fuel cell stack.

In the present disclosure, provided is a fuel cell system installed and used in a vehicle, the fuel cell system including:
a fuel cell stack,
a reaction gas supply portion that supplies reaction gas to the fuel cell stack,
a control unit that controls a flow rate of the reaction gas,
in which when power generation of the fuel cell stack is stopped, the control unit performs two stages of purging that are a first purging and a second purging in which the flow rate of the reaction gas is smaller than the flow rate of the reaction gas of the first purging, and provides a purging standby time between the first purging and the second purging, and
in a case in which an operation mode of the fuel cell stack when power generation of the fuel cell stack is stopped is a high output mode in which an output is higher than the output of a normal mode, the control unit makes a purging time longer than the purging time of the first purging that is performed in the normal mode.

In the present disclosure, in a case in which the operation mode of the fuel cell stack when power generation of the fuel cell stack is stopped is a low output mode in which the output is lower than the output of the normal mode, the control unit may make the purging time shorter than the purging time of the first purging that is performed in the normal mode or may not perform the first purging, and may increase the time of at least one of the purging standby time and the purging time of the second purging that are performed in the normal mode.

According to the fuel cell system of the present disclosure, by increasing the first purging time in which the gas flow rate is large and drying the MEA more than usual so as to optimize the water amount of the MEA, the dispersion resistance of the fuel gas and the oxidant gas becomes small, and it is easier for the fuel cell stack to have a high output when the fuel cell stack is started, and the startability of the fuel cell stack can be made satisfactory.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a flowchart showing an example of a control method of the fuel cell system of the present disclosure.

DETAILED DESCRIPTION OF EMBODIMENTS

In the present disclosure, provided is a fuel cell system installed and used in a vehicle, the fuel cell system including:
 a fuel cell stack,
 a reaction gas supply portion that supplies reaction gas to the fuel cell stack,
 a control unit that controls a flow rate of the reaction gas,
 in which when power generation of the fuel cell stack is stopped, the control unit performs two stages of purging that are a first purging and a second purging in which the flow rate of the reaction gas is smaller than the flow rate of the reaction gas of the first purging, and provides a purging standby time between the first purging and the second purging, and
in a case in which an operation mode of the fuel cell stack when power generation of the fuel cell stack is stopped is a high output mode in which an output is higher than the output of a normal mode, the control unit makes a purging time longer than the purging time of the first purging that is performed in the normal mode.

There are various types of purging purposes when power generation of the fuel cell stack is stopped, and they are roughly divided into the following purposes.

(1) Dry the MEA part in each single cell of the stack for the purpose of improving the output of the stack at the next start below freezing point.

(2) Purge the residual water accumulated in parts such as a gas flow path and comb teeth portion of a separator of each single cell of the stack for the purpose of securing the supply flow path of the reaction gas at the next start below the freezing point.

(3) Purging the residual water accumulated in parts of gas piping system parts such as a manifold of the stack for the purpose of suppressing the inflow of liquid water to a power generation unit such as the MEA at the next start.

(4) Purging the residual water accumulated in parts such as auxiliary equipment for the purpose of suppressing abnormal noise due to water entrainment, deterioration of fuel efficiency, and freezing at the next start.

If purging is performed with a large flow rate and for a long period of time, it is possible to purge all parts of the above (1) to (4), but there is a problem that the fuel consumption deteriorates.

With the conventional purging method, purging in which the part to be drained is specified is not possible, and purging is carried out uniformly. Thus, it is not possible to select a purging means that meets the needs of customers, and there is unnecessary purging from the functional point of view. As a result, there are problems such as a long purging time and deterioration of fuel efficiency.

The researchers focused on the fact that the behavior of removing residual water from the stack differs depending on the level of the stack water temperature, and discovered a way of changing, based on an operation mode, a purging time of a first purging that is performed to dry the MEA and that is performed by setting the stack water temperature to a relatively high temperature, a purging standby time until the residual water from the stack drips to the gas piping system parts due to steam condensation caused by lowering of the stack temperature that is at a high temperature after gravity drainage and the first purging, a purging time of a second purging that is performed to drain the residual water accumulated in the gas piping system parts that proactively use dynamic pressure waste water and that is able to purge even when the stack water temperature is a relatively low temperature.

According to the present disclosure, it is possible to select a drainage method based on functional needs, a drainage method based on customer needs, and the like.

In the present disclosure, the gas piping system parts indicate a stack manifold, gas piping such as a gas flow path, and parts related to gas of the stack such as a drainage valve, a fuel off-gas discharge valve, an oxidizing agent gas pressure adjusting valve, a purging valve, a bypass valve, and parts of an air/liquid separator, and the like.

The fuel cell system of the present disclosure includes at least a fuel cell stack, a reaction gas supply portion that supplies reaction gas to the fuel cell stack, and a control unit that controls a flow rate of reaction gas.

The fuel cell system of the present disclosure is usually installed and used in a fuel cell vehicle in which a drive source is an electric motor. Further, the fuel cell system of the present disclosure may be installed in and used in a vehicle capable of traveling with the electric power of a secondary battery. The electric motor is not particularly limited, and may be a conventionally known drive motor.

The fuel cell stack may be a stacked body in which a plurality of single cells of the fuel cell are stacked.

The number of stacked single cells is not particularly limited, and may be, for example, 2 to several hundreds or 2 to 200.

The fuel cell stack may include end plates at both ends of the single cell in a stacking direction.

The single cell of the fuel cell may include at least a membrane electrode assembly containing an oxidant electrode, an electrolyte membrane, and a fuel electrode, and two separators sandwiching both sides of the membrane electrode assembly as needed.

The separator may have a reaction gas flow path on the surface in contact with a gas diffusion layer. Further, the separator may have a coolant flow path for keeping the temperature of the fuel cell constant on the surface opposite to the surface in contact with the gas diffusion layer.

The separator may have a supply hole and a discharge hole for making the reaction gas and the coolant flow in the stacking direction of the single cell.

Examples of the supply hole include a fuel gas supply hole, an oxidant gas supply hole, and a coolant supply hole.

Examples of the discharge hole include a fuel gas discharge hole, an oxidant gas discharge hole, and a coolant discharge hole.

The separator may be a gas-impermeable conductive member or the like. The conductive member may be, for example, dense carbon obtained by compressing carbon to make it gas impermeable, a press-molded metal (for example, iron, aluminum, stainless steel, etc.) plate or the like. Further, the separator may have a current collecting function.

The fuel cell stack may have a manifold such as an inlet manifold with which each supply hole is in communication and an outlet manifold with which each discharge hole is in communication.

Examples of the inlet manifold include an anode inlet manifold, a cathode inlet manifold, and a coolant inlet manifold.

Examples of the outlet manifold include an anode outlet manifold, a cathode outlet manifold, and a coolant outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may include, for example, a catalyst metal that promotes an electrochemical reaction, an electrolyte having proton conductivity, carbon particles having electron conductivity, and the like.

As the catalyst metal, for example, platinum (Pt) and an alloy composed of Pt and another metal (for example, a Pt alloy in which cobalt, nickel, etc. are mixed) can be used.

The electrolyte may be a fluororesin or the like. As the fluororesin, for example, a Nafion solution or the like may be used.

The catalyst metal is supported on carbon particles, and carbon particles (catalyst particles) carrying the catalyst metal and an electrolyte may be mixed in each catalyst layer.

For the carbon particles for supporting the catalyst metal (supporting carbon particles), water-repellent carbon particles whose water repellency is enhanced by heat-treating commercially available carbon particles (carbon powder) may be used, for example.

The gas diffusion layer may be a conductive member or the like having gas permeability.

Examples of the conductive member include a carbon porous body such as carbon cloth and carbon paper, a metal mesh, and a metal porous body such as foamed metal.

The electrolyte membrane may be a solid polymer electrolyte membrane. Examples of the solid polymer electrolyte membrane include a fluorine-based electrolyte membrane such as a thin film of perfluorosulfonic acid containing moisture, a hydrocarbon-based electrolyte membrane, and the like. The electrolyte membrane may be, for example, a Nafion membrane (manufactured by DuPont) or the like.

The fuel cell system may have the reaction gas supply portion that supplies the reaction gas to the electrodes of the fuel cell.

The reaction gas supply portion supplies the reaction gas to the fuel cell stack.

The reaction gas is a concept including a fuel gas and an oxidant gas. Examples of the reaction gas supply portion include a fuel gas supply portion, an oxidant gas supply portion, and the like, and the fuel cell system may have one of these supply units or may have both of these supply units.

The fuel cell system may have the fuel gas supply portion that supplies fuel gas to the fuel electrode of the fuel cell.

The fuel gas is a gas mainly containing hydrogen, and may be, for example, hydrogen gas.

Examples of the fuel gas supply portion include a fuel tank and the like, and specific examples thereof include a liquid hydrogen tank and a compressed hydrogen tank.

The fuel cell system may include a fuel gas supply channel.

The fuel gas supply flow path connects the fuel cell and the fuel gas supply portion, and enables the fuel gas to be supplied from the fuel gas supply portion to the fuel electrode of the fuel cell.

The fuel cell system may include a circulation flow path.

The circulation flow path makes it possible to recover the fuel off-gas discharged from the fuel electrode of the fuel cell and return it as the circulating gas to the fuel electrode of the fuel cell.

The fuel off-gas includes fuel gas that has passed unreacted at the fuel electrode, moisture at which the generated water generated at the oxidant electrode has reached the fuel electrode, and oxidant gas that may be supplied to the fuel electrode during purging.

If necessary, the fuel cell system may include a circulation pump such as a hydrogen pump for adjusting the flow rate of the circulating gas on the circulation flow path, an ejector, and the like.

The circulation pump may be electrically connected to the control unit, and the flow rate of the circulating gas may be adjusted by controlling the on/off of the drive of the circulation pump, the rotation speed, and the like with the control unit.

The ejector is arranged at the merging portion of the fuel gas supply flow path and the circulation flow path, for example, and supplies a mixed gas containing the fuel gas and the circulation gas to the fuel electrode of the fuel cell. As the ejector, a conventionally known ejector can be adopted.

The circulation flow path may be provided with a gas-liquid separator for reducing the moisture in the fuel off-gas. A drainage flow path branched from the circulation flow path by the gas-liquid separator and a drainage valve on the drainage flow path may be provided.

In the gas-liquid separator, the moisture separated from the fuel off-gas may be discharged by opening the drainage valve provided in the drainage flow path branched from the circulation flow path.

The drainage valve may be electrically connected to the control unit, and the amount of drainage of liquid water may be adjusted by controlling the opening and closing of the drainage valve with the control unit.

The fuel cell system may include a fuel off-gas discharge portion.

The fuel off-gas discharge portion makes it possible to discharge the fuel off-gas to the outside (outside the system). The outside may be the outside of the fuel cell system or the outside of the vehicle.

The fuel off-gas discharge portion may be provided with a fuel off-gas discharge valve, and may further include a fuel off-gas discharge flow path, if necessary.

The fuel off-gas discharge valve may be electrically connected to the control unit, and the fuel off-gas discharge flow rate may be adjusted by controlling the opening and closing of the fuel off-gas discharge valve with the control unit.

The fuel off-gas discharge flow path may be branched from the circulation flow path, for example, and enables the fuel off-gas to be discharged to the outside when the hydrogen concentration in the fuel off-gas becomes too low.

The fuel cell system may include the oxidant gas supply portion, an oxidant gas supply flow path, and an oxidant gas discharge flow path.

The oxidant gas supply portion supplies oxidant gas to at least the oxidant electrode of the fuel cell.

As the oxidant gas supply portion, for example, an air compressor or the like can be used. The air compressor is driven based on a control signal from the control unit, and introduces oxidant gas into the cathode side (oxidant electrode, cathode inlet manifold, etc.) of the fuel cell.

The oxidant gas supply channel connects the oxidant gas supply portion and the fuel cell, and enables oxidant gas to be supplied from the oxidant gas supply portion to the oxidant electrode of the fuel cell.

Oxidant gas is oxygen-containing gas and may be air, dry air, pure oxygen or the like.

The oxidant gas discharge flow path allows oxidant gas to be discharged from the oxidant electrode of the fuel cell.

An oxidant gas pressure regulating valve may be provided in the oxidant gas discharge flow path.

The oxidant gas pressure regulating valve is electrically connected to the control unit, and the oxidant gas pressure regulating valve is opened by the control unit to discharge the reacted cathode off-gas from the oxidant gas discharge flow path. Further, by adjusting the opening degree of the oxidant gas pressure adjusting valve, the oxidant gas pressure (cathode pressure) supplied to the oxidant electrode can be adjusted.

An intercooler may be arranged in the oxidant gas supply flow path. The intercooler is connected to the coolant circulation flow path, exchanges heat with the coolant, and cools the oxidant gas discharged from the oxidant gas supply portion. Further, when there is a request for warming up the fuel cell (pretreatment for power generation), the temperature of the coolant is raised by the heat of oxidant gas that is compressed by the oxidant gas supply portion so that the temperature thereof is raised.

The fuel cell system may include a bypass flow path that branches off from the oxidant gas supply flow path on the downstream side of the intercooler, that bypasses the fuel cell, and that is connected to the oxidant gas discharge flow path. A bypass valve for controlling the open state of the bypass flow path is arranged in this bypass flow path. The bypass valve is electrically connected to the control unit, and for example, when the oxidant gas supply portion is driven to consume power of the secondary battery in a situation in which the charge capacity of the secondary battery is insufficient during the regenerative power generation of the drive motor, the bypass valve is opened by the control unit. As a result, the oxidant gas is discharged to the oxidant gas discharge flow path without being sent to the fuel cell.

Further, the fuel gas supply flow path and the oxidant gas supply flow path may be connected via a merging flow path. A purging valve may be provided in the merging flow path.

The purging valve is electrically connected to the control unit, and the purging valve may be opened by the control unit so that the oxidant gas of the oxidant gas supply portion flows into the fuel gas supply flow path as purging gas.

The purging gas used for purging may be a reaction gas. The reaction gas may be a fuel gas, an oxidant gas, or a mixed reaction gas containing both of these gases.

The fuel cell system may include a coolant supply portion and a coolant circulation flow path as a cooling system for the fuel cell.

The coolant circulation flow path communicates with a coolant supply hole and a coolant discharge hole provided in the fuel cell, circulates the coolant supplied from the coolant supply portion inside and outside the fuel cell, and enables the fuel cell to be cooled.

Examples of the coolant supply portion include a cooling water pump and the like. The coolant circulation flow path may be provided with a radiator that dissipates heat from the cooling water.

As the cooling water (coolant), for example, a mixed solution of ethylene glycol and water can be used in order to prevent freezing at a low temperature.

The fuel cell system may include a secondary battery.

The secondary battery (battery) may be any rechargeable battery, and examples thereof include a conventionally known secondary battery such as a nickel hydrogen secondary battery and a lithium ion secondary battery. Further, the secondary battery may include a power storage element such as an electric double layer capacitor. The secondary battery may have a configuration in which a plurality of secondary batteries are connected in series. The secondary battery supplies electric power to an oxidant gas supply portion such as an electric motor and an air compressor. The secondary battery may be rechargeable from an external power source of the vehicle, such as a household power source. The secondary battery may be charged by the output of the fuel cell.

The fuel cell system may include auxiliary equipment powered by the battery.

Examples of auxiliary equipment include vehicle lighting equipment, air conditioning equipment, and the like.

The control unit may control the charging/discharging of the secondary battery.

The control unit controls the gas flow rate of the reaction gas.

The control unit is connected, via an input/output interface, to the gas-liquid separator, the drainage valve, the fuel off-gas discharge valve, the oxidant gas pressure control valve, the purging valve, the fuel gas supply portion, the oxidant gas supply unit, the bypass valve, the secondary battery, the circulation pump, etc. Further, the control unit may be electrically connected to an ignition switch which may be installed in the vehicle.

The control unit physically includes, for example, an arithmetic processing unit such as a central processing unit (CPU), a read-only memory (ROM) that stores a control program and control data processed by the CPU, a storage device such as a random access memory (RAM) that is mainly used as various work areas for processing, and an input/output interface. Further, the control unit may be, for example, a control device such as an ECU (engine control unit).

When power generation of the fuel cell is stopped, the control unit performs two-stage purging, which is a first purging and a second purging in which the flow rate of the reaction gas is smaller than that of the first purging, and between the first purging and the second purging the control unit provides a purging standby time.

The first purging is mainly for drying the MEA.

The time for performing the first purging in the normal purging mode is not particularly limited. For example, the control unit may manage the dry state of the MEA by the impedance of the MEA, and the control unit may set the first purging so that the purging is finished when the impedance of the MEA reaches a predetermined target value.

Specifically, the time for performing the first purging in the normal purging mode may be 10 seconds or more, 20 seconds or more, 30 seconds or more, 40 seconds or more, 50 seconds or more, 55 seconds or more, or 1 minute or more, and the upper limit is not particularly limited. The gas flow rate of the first purging in the normal purging mode is not particularly limited as long as it is larger than the gas flow rate of the second purging.

The gas flow rate of the first purging in the normal purging mode can be appropriately set by preparing a data group showing the correlation between the MEA impedance and the gas flow rate in advance, and taking into consideration the fuel efficiency, the purging time, etc. from the data group, for example.

In the gas flow rate of the first purging in the normal purging mode, specifically, the oxidant gas supply flow rate when the oxidant gas supply portion is an air compressor may be 1000 NL/min or more, 1200 NL/min or more, or 1400 NL/min., and the upper limit is not particularly limited, and may be 2000 NL/min or less.

The method for controlling the gas flow rate is not particularly limited, and a conventionally known method can be adopted. For example, the supply flow rate of the fuel gas from the fuel gas supply portion may be controlled, the circulating gas flow rate may be controlled by adjusting the rotation speed of the circulation pump provided in the circulation flow path, the supply flow rate of the oxidant gas from the oxidant gas supply portion may be controlled, the opening degree of the fuel off-gas discharge valve may be controlled, the opening degree of the oxidizing agent gas pressure adjusting valve may be controlled, or these controls may be used in combination.

The main purpose of purging standby (waiting for the residual water to drip) is to wait for the residual water to drip from the stack by reducing the flow rate of gas flowing to the stack or not having gas flow to statically leave the stack.

Specifically, the gas flow rate during purging standby in the normal purging mode may be 600 NL/min or less or may be 0 NL/min when the oxidant gas supply portion is an air compressor.

The purging standby time (the time waiting for the residual water to drip) in the normal purging mode is not particularly limited, and may be appropriately set from, for example, the moving speed of the residual water from the stack measured in advance.

Specifically, the purging standby time in the normal purging mode may be 10 seconds or longer, 20 seconds or longer, 30 seconds or longer, 40 seconds or longer, 50 seconds or longer, 1 minute or longer, and the upper limit is not particularly limited.

By providing the purging standby time, overdrying of the stack can be suppressed as compared with the case in which only the first purging or the two-stage purging of the first purging and the second purging is performed. Further, by providing the purging standby time, the residual water in the stack seeps out, drips out of the stack, and accumulates in gas piping system parts and the like.

The main purpose of the second purging is to reduce the purging noise and improve the fuel efficiency, and to purge the water accumulated in the gas piping system parts after the residual water from the stack drips.

The time for performing the second purging in the normal purging mode is not particularly limited, and may be the same as or different from the purging time of the first purging. By shortening the purging time of the second purging air, it is possible to balance securing the moisture of the electrolyte membrane and removing the residual water accumulated in the gas piping system parts. For example, a data group showing the relationship between the amount of residual water in the gas piping system parts and the purging time may be prepared in advance and the purging time of the second purging may be appropriately set from the data group.

Specifically, the time for performing the second purging in the normal purging mode may be 10 seconds or more, 20 seconds or more, 30 seconds or more, 40 seconds or more, 50 seconds or more, 55 seconds or more, or 1 minute or more, and the upper limit is not particularly limited.

The gas flow rate of the second purging in the normal purging mode is not particularly limited as long as it is smaller than the gas flow rate of the first purging. By reducing the gas flow rate of the second purging, it is possible to remove the residual water accumulated in the gas piping system parts without depriving the electrolyte film of water more than necessary, and it is possible to balance securing the moisture of the electrolyte film and removing the residual water accumulated in the gas piping system parts. By reducing the gas flow rate of the second purging, the purging noise can be reduced, and a driver who leaves the vehicle after power generation of the fuel cell stack is stopped (after IG-OFF) will feel less uncomfortable from the continuation of the purging operation. For example, a data group that shows the correlation between the residual water amount of the gas piping system parts and the gas flow rate may be prepared in advance, and the gas flow rate of the second purging can be appropriately set from the data group in consideration of fuel consumption, purging time, and the like.

The gas flow rate of the second purging in the normal purging mode, specifically the oxidant gas supply flow rate when the oxidant gas supply portion is an air compressor may be is 500 NL/min or more or 600 NL/min or more, or may be 900 NL/min or less and 800 NL/min or less.

Since the main purpose of the second purging is not to dry the MEA, it is not necessary to raise the temperature of the cooling water of the stack to a high temperature. For example, purging may be performed by rotating the motor of the oxidant gas supply portion of the air compressor with power of a secondary battery.

Thus, the second purging may be a purging method in which the purging noise is small and which is fuel-efficient, although the purging time is long.

FIG. 1 is a flowchart showing an example of a control method of the fuel cell system of the present disclosure. The present disclosure is not necessarily limited to the present typical example.

(1) Determination of Operation Mode

When the ignition switch is switched from ON to OFF (IG-OFF) and a vehicle operation stop signal is input to the control unit, the control unit stops the supply of fuel gas from the fuel gas supply portion to the fuel electrode so as to stop power generation of the fuel cell stack.

The control unit determines whether the operation mode of the fuel cell stack when power generation of the fuel cell stack is stopped is in the normal mode, the high output mode with higher output than the normal mode, or the low output mode with lower output than the normal mode. Whether the operation mode is the normal mode, the high output mode, or the low output mode may be determined by the amount of power generated by the fuel cell stack or the like.

(2) In Case of Normal Mode (Normal Purging Mode)

In the case in which the operation mode of the fuel cell stack when power generation of the fuel cell stack is stopped is the normal mode, the control unit performs as the normal purging mode, the first purging for a predetermined time, standby for the purging for a predetermined time, and then the second purging for a predetermined time.

(3) In Case of High Output Mode (Purging Mode at High Output)

In the case in which the operation mode of the fuel cell stack when power generation of the fuel cell stack is stopped is the high output mode in which the output is higher than the normal mode, the control unit increases the purging time to be longer than the purging time of the first purging that is performed in the normal mode, as the high output purging mode.

In the high-power purging mode, since the amount of fuel gas consumed increases, the fuel economy deteriorates, the large gas flow rate causes a loud purging noise, and the purging time further increases. However, the MEA can be made drier and the output of the stack at the next start can be easily output than in the normal purging mode. This is considered to be due to the following reasons. That is, at low temperatures lower than normal temperature and below freezing point, the water temperature of the stack tends to easily decrease, and liquid water tends to stay in the MEA portion of the single cell, particularly the single cell. In that case, since the diffusion resistance of the fuel gas and the oxidant gas increases, the current density-voltage (IV) curve tends to deteriorate. Thus, by accelerating the drying of MEA more than in the normal purging mode, the diffusion resistance of the fuel gas and the oxidant gas becomes smaller, and the reaction gas easily reaches the catalytic reaction part (anode, cathode). Therefore, even if the fuel gas supply amount and the oxidant gas supply amount are the same, the IV curve can be further improved, which can contribute to the improvement of the output of the stack.

The purging time of the first purging in the high output purging mode is not particularly limited as long as it is longer than the purging time of the first purging performed in the normal mode, and may be appropriately set in consideration of fuel consumption, purging time, and the like.

(4) In Case of Low Output Mode (Purging Mode at Low Output)

When the operation mode of the fuel cell stack when power generation of the fuel cell stack is stopped is the low output mode in which the output is lower than the normal mode, as the low output purging mode, the control unit makes the purging time shorter than the purging time of the first purging that is performed in the normal mode or does not perform the first purging, and increases at least one of the purging standby time and the purging time of the second purging performed in the normal mode.

In the low output purging mode, since the time of the first purging with a large gas flow rate is shortened or the first purging is not performed, the purging noise is small and the ratio of the second purging with a small gas flow rate is high, and the purging mode has a good fuel efficiency.

The purging time of the first purging in the low output purging mode is not particularly limited as long as it is shorter than the purging time of the first purging performed in the normal mode and may be appropriately set in consideration of fuel consumption, purging time, and the like, and it is not necessary to perform the first purging.

The purging standby time in the low output purging mode may be the same as or longer than the purging standby time performed in the normal mode and may be appropriately set in consideration of the purging time and the like.

The purging time of the second purging in the low output purging mode may be the same as or longer than the purging time of the second purging performed in the normal mode, and may be appropriately set in consideration of the fuel consumption, purging time, etc.

In the case of the low output purging mode, at least one of the purging standby time and the purging time of the second purging performed in the normal mode may be increased, or both times may be lengthened.

According to the fuel cell system of the present disclosure, in the high power purging mode, the MEA is dried more than in the normal purging mode, and the water content of the MEA is optimized so that the dispersion resistance of the fuel gas and the oxidant gas decreases, and it can be made easier for the fuel cell stack to have a high output when the fuel cell stack is started, and the startability of the fuel cell stack can be made satisfactory.

Further, according to the fuel cell system of the present disclosure, with the low output purging mode, it is possible to shorten the purging time of the first purging that has a large flow rate and that affects the fuel efficiency more than the case of the normal purging mode and instead, it is possible to perform the purging in which the effect on the fuel efficiency is small by increasing the time of at least one of the second purging time that has a small flow rate and that has little effect on the fuel efficiency and the purging standby time.

What is claimed is:

1. A fuel cell system installed and used in a vehicle, the fuel cell system comprising:
   a fuel cell stack;
   a reaction gas supply portion that supplies reaction gas to the fuel cell stack; and
   a control unit configured to controls a flow rate of the reaction gas,
      wherein when power generation of the fuel cell stack is stopped in a normal mode, the control unit is configured to perform two stages of purging that are a first purging and a second purging in which the flow rate of the reaction gas is smaller than the flow rate of the reaction gas of the first purging, and provide a purging standby time between the first purging and the second purging, and
      wherein in a case in which an operation mode of the fuel cell stack when power generation of the fuel cell stack is stopped is a high output mode in which an output is higher than the output of the normal mode, the control unit is configured to make a purging time of the first purging longer than the purging time of the first purging that is performed in the normal mode.

2. The fuel cell system according to claim 1, wherein in a case in which the operation mode of the fuel cell stack when power generation of the fuel cell stack is stopped is a low output mode in which the output is lower than the output of the normal mode, the control unit is configured to make the purging time of the first purging shorter than the purging time of the first purging that is performed in the normal mode or not to perform the first purging, and to make at least one of the purging standby time and a purging time of the second purging longer in the low output mode than in the normal mode.

* * * * *